Feb. 27, 1934.  A. DANIELCZUK  1,948,983
WEED RESISTING FISH LURE
Filed Jan. 26, 1933
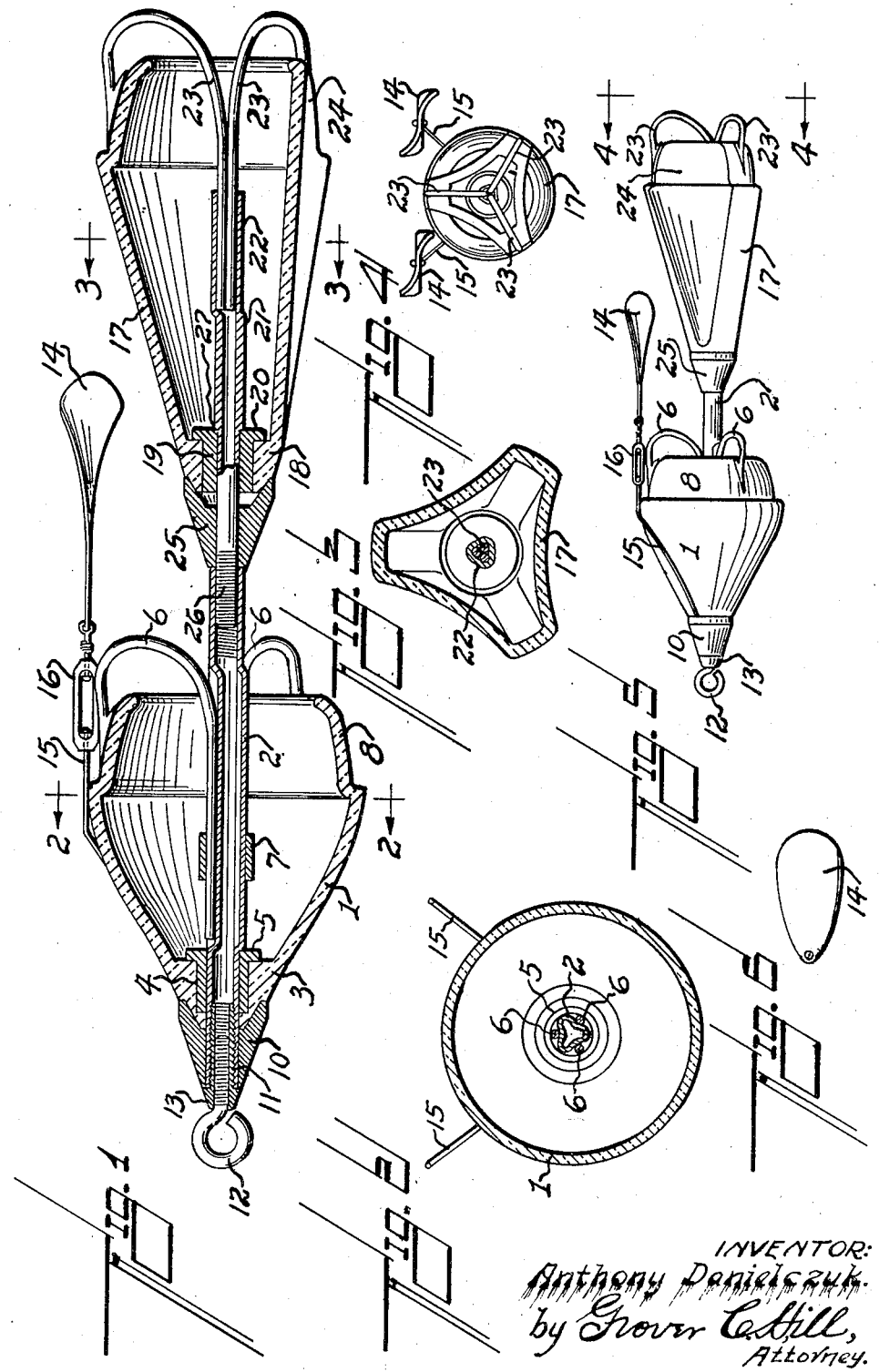
INVENTOR:
Anthony Danielczuk
by Grover C. Hill,
Attorney.

Patented Feb. 27, 1934

1,948,983

UNITED STATES PATENT OFFICE 1,948,983

WEED RESISTING FISH LURE

Anthony Danielczuk, Detroit, Mich.

Application January 26, 1933. Serial No. 653,605

3 Claims. (Cl. 43—39)

My invention relates to improvements in fish lures and provides a device of this character embodying all of the essentials necessary to make up a good, practical and useful fish lure, and in addition to these advantages my invention is constructed in a particular manner so as to cause it to effectively resist all kind of weeds, or in fact it is completely weed-resisting.

It will become readily apparent during the progress of my disclosure which is revealed in the following detailed description, illustrated throughout the accompanying drawing and in the appended claims, that my invention possesses further novel features and advantages.

With reference to the accompanying drawing, which for an important part of my disclosure:

Figure 1 is an enlarged longitudinal section of the complete invention substantially through the center of the same.

Figure 2 is a transverse section taken substantially upon line 2—2 of Figure 1.

Figure 3 is also a transverse section taken substantially upon line 3—3 of Figure 1.

Figure 4 is an end elevation taken from the position of line 4—4 of Figure 5.

Fig. 5 is a side view.

Figure 6 is a view of one of the rotating fins of the device.

My invention is composed of two units which I will distinguish by the front and rear units respectively.

The front unit comprises a substantially pear-shaped body 1, which is preferably of resilient rubber and is supported upon tube 2 in the following manner:

Body 1 has reinforced portion 3 formed thereupon and which has a passage to accommodate sleeve 4 with flange 5 thereon as shown. Tube 2 is formed as indicated in Figures 1 and 2. The customary hooks 6 are secured to the exterior of tube 2 by band 7, and it is further observed that shouldered portion 8 is formed upon body 1 in order that the spear end of hooks 6 will normally contact the said body portion as shown in Figure 1.

Tube 2 has internally threaded end 11 which is adapted to engage the similar threaded shank of collar 13, and cone shape cap 10 being telescopically engaged with said end also, with eyelet member 12 threadedly engaging the internally threaded shank of aforesaid collar, all of which is clearly set forth in Figure 1.

The rear unit of the device is composed of conically disposed body 17 like body 1 is preferably of resilient rubber. Reinforced portion 18 of body 17 has a passage to accommodate sleeve 19 with flange 20 as indicated in Figure 1. Tube 21 is provided and has portion 22 formed thereon which is adapted to receive the stem of the usual hooks 23, and it is further observed that body 17 is provided with shouldered portion 24 in order that the spear end of the said hooks will normally contact the said body portion as shown. Reinforced portion 18 of body 17 is received into cone-shaped cap 25 through which one end of tube 21 passes. End 26 of tube 21 has external threads and is adapted to engage the similar threaded end of tube 2 of the front unit. It is also noted that end 26 of tube 21 is somewhat reduced thereby forming shoulder as at 27, as clearly indicated in Figure 1.

One of the outstanding advantages of the invention are the shouldered portions 8 and 24 of the bodies 1 and 17 respectively. The said portions guard the spear end of hooks 6 and 23 and effectively render the device weed-resisting for the intended purpose.

The device is also very substantially constructed throughout and will withstand hard use without affecting the stability thereof. The rotating fins 14 are for the customary purpose of effecting life-like action of the device.

It is now understood that I have hereinabove described and with the aid of the accompanying drawing, illustrated a single embodiment of my invention, however the right is reserved whereby I may make certain minor changes in the details of construction, if this becomes necessary during any probable further development of the invention for the market, but in all events a departure from the general principle as disclosed would be consistently avoided.

Having thus described my invention, what I claim as new is:

1. In a weed-resisting fish lure, a front unit for same, said unit consisting of a substantially pear-shaped body, a tube passing longitudinally through the body, said body having a reinforced front end and a flanged sleeve passing through said end, one end of the aforesaid tube passing through said sleeve, said tube and sleeve being for the purpose of rigidly supporting the aforesaid body.

2. In a weed-resisting fish lure, a front unit for same, said unit consisting of a substantially pear-shaped body, the front end of said body being reinforced, a tube passing longitudinally through said body, a flanged sleeve mounted upon the forward portion of said tube and within said reinforced front end, a sleeve with a collar formed thereon, said sleeve having external and internal threads, the forward end of the aforesaid tube being internally threaded and adapted to engage the last-named sleeve, a cone-shaped cap intermediate said collar and aforesaid reinforced front end, and an eyelet member for the device, the stem of said member being adapted to threadedly engage said sleeve with the collar formed thereon.

3. In a weed-resisting fish lure, a front unit for same, said unit consisting of a substantially pear-shaped body, a tube passing longitudinally through said body, means for securing the stems of a plurality of fish hooks to said tube, comprising a sleeve adapted to telescopically engage said tube with said fish hook stems intermediate the sleeve and the tube, means upon said body for resisting weeds, consisting of a circumferentially arranged shouldered portion upon the rear end of said body, and this portion being adapted to conform to the barbs of the fish hooks, also said shouldered portion being of a lesser diameter than the adjacent portion of said body so that the barbs of the hooks will be completely protected from contacting weeds as the device is conveyed forwardly through the water.

ANTHONY DANIELCZUK.